United States Patent [19]

Nakamats

[11] Patent Number: 5,731,676
[45] Date of Patent: Mar. 24, 1998

[54] ENERGY CONVERSION APPARATUS FOR CONVERTING RADIANT ENERGY TO ROTARY FORCE

[76] Inventor: Yoshiro Nakamats, 1105-10-1, Minami-Aoyama 5-chome, Minato-ku, Tokyo, Japan

[21] Appl. No.: 762,016

[22] Filed: Dec. 11, 1996

[30] Foreign Application Priority Data

May 14, 1996 [JP] Japan ................................. 8-154699

[51] Int. Cl.$^6$ ............................. H02N 1/00; H02K 41/02
[52] U.S. Cl. ................... 318/471; 318/139; 310/12; 310/309
[58] Field of Search .................. 318/16, 138, 139, 318/470–479; 310/49 R, 11, 300–309; 204/59 R, 63

[56] References Cited

U.S. PATENT DOCUMENTS

| | | | |
|---|---|---|---|
| 4,127,453 | 11/1978 | Radebold | 310/300 |
| 4,381,462 | 4/1983 | Radebold | 310/11 |
| 4,634,343 | 1/1987 | Nakamats | 310/306 |
| 4,663,932 | 5/1987 | Cox | 60/200 |
| 4,814,657 | 3/1989 | Yano et al. | 310/309 |
| 5,262,695 | 11/1993 | Kuwano et al. | 310/309 |

*Primary Examiner*—Paul Ip
*Attorney, Agent, or Firm*—Jordan and Hamburg

[57] ABSTRACT

An anergy conversion apparatus for generating rotational force and AC power has first and second banks of solar cells configured for continuous exposure to light. Each of the banks has a charge storage device, such as a capacitor or a battery, connected thereto in parallel. A motor assembly has a stator with coils connected to commutating solar cells disposed on said stator and the first and second banks of solar cells such that the commutating solar cells control current passing through the coils from the first and second banks of solar cells. A rotor assembly is rotatably mounted on the stator assembly and has a set of permanent magnets for producing fields interacting with fields produce by the coils and a mask for selectively shielding the commutating solar cells to apply current from the first and second banks of solar cells to the coils to effect rotation of the rotor. AC power is tapped from terminals disposed across the coils. An alternative embodiment has three coils connected in a delta configuration, each of the coils has an associated commutating solar cell and the rotor has a mask for shield one of the commutating solar cells at a time to produce three-phase AC power across the three coils.

18 Claims, 2 Drawing Sheets

5,731,676

ENERGY CONVERSION APPARATUS FOR CONVERTING RADIANT ENERGY TO ROTARY FORCE

BACKGROUND OF THE INVENTION

The present invention relates to an apparatus for converting radiant energy to rotary force and AC power and, more particularly, to an apparatus having energy converting cells and a commutating shielding member for selectively shielding energy converting cells. The apparatus provides efficient conversion of radiant energy, such as light, heat, or other forms of radiant energy, into rotary force.

Conventional solar cell and electric motor systems require the use of commutator brushes or DC/AC converters to produce alternating current for driving a rotor assembly of the electric motor. Use of such devices adds complexity, weight and bulk to the system resulting in increased cost of manufacture and inconvenient transport.

SUMMARY OF THE INVENTION

Accordingly, it is an object of the invention to provide a radiant energy conversion apparatus for producing rotary force which overcomes the drawbacks of the prior art.

It is a further object of the invention to provide a high efficiency radiant energy conversion apparatus for producing rotary motion by generating a rotating magnetic field using electric current from radiant energy conversion cells, converting energy such as light or heat directly into electricity, to drive coils producing the rotating magnetic field without the use of brushes or DC/AC converters wherein the rotating magnetic field interacts with another magnetic field to drive a rotor.

Briefly stated, the present invention provides an energy conversion apparatus for generating rotational force and AC power having first and second banks of solar cells configured for continuous exposure to light. Each of the banks has a charge storage device, such as a capacitor or a battery, connected thereto in parallel. A motor assembly has a stator with coils connected to commutating solar cells disposed on the stator and the first and second banks of solar cells such that the commutating solar cells control current passing through the coils from the first and second banks of solar cells. A rotor assembly is rotatably mounted on the stator assembly and has a set of permanent magnets for producing fields interacting with fields produce by the coils and a mask for selectively shielding the commutating solar cells to apply current from the first and second banks of solar cells to the coils to effect rotation of the rotor. AC power is tapped from terminals disposed across the coils. An alternative embodiment has three coils connected in a delta configuration, each of the coils has an associated commutating solar cell and the rotor has a mask for shielding one of the commutating solar cells at a time to produce three-phase AC power across the three coils.

In accordance with these and other objects of the invention, there is provided an energy conversion apparatus for converting radiant energy to rotary force and AC power, the energy conversion apparatus comprising a first conversion device for converting radiant energy into electric current and the first conversion device being situated to be continuously exposed to a radiant energy incident upon the energy conversion apparatus and including first and second banks of conversion cells and first and second charge storage devices connected in parallel with the first and second banks of conversion cells. A motor assembly for rotating a shaft is provided, the motor assembly having rotor and stator assemblies and one of the rotor and stator assemblies including coils for generating a rotating magnetic field rotating with respect to the one of the rotor and stator assemblies and another one of the rotor and stator assemblies including devices for generating a constant magnetic field for interaction with the rotating magnetic field to effect rotation of the shaft. The coils are serially connected and disposed circumferentially equidistant one another on the one of the rotor and stator assemblies with alternating winding polarities to produce a circumferentially alternating magnetic field when driven by current in a given direction. First and second sets of conversion devices, for producing and conducting electric current when exposed to radiant energy and exhibiting high resistance when not exposed to radiant energy, are disposed on one of the rotor and stator assemblies. Interconnections are provided for connecting the first energy conversion device to the coils and the first and second sets of conversion devices such that alternating exposure of the first and second sets of conversion devices delivers alternating current to the coils from the first energy conversion device and the first and second sets of conversion devices. A mask, disposed on another one of the rotor and stator assemblies not having the first and second sets of conversion devices, alternately exposes to and shields from the radiant energy the first and second sets of conversion devices as the rotor assembly rotates relative to the stator assembly to commutate current to the coils from the first conversion device to effect rotary motion. Terminals are provided across the coils for outputting AC power.

The present invention also provides an energy conversion apparatus for converting radiant energy to rotary force and AC power, the energy conversion apparatus including a first conversion device for converting radiant energy into electric current, the first conversion device being situated to be continuously exposed to a radiant energy incident upon the energy conversion apparatus and including first, second and third banks of conversion cells and first, second and third charge storage devices connected in parallel with the first, second and third banks of conversion cells. A motor assembly is provided for rotating a shaft, the motor assembly having rotor and stator assemblies. One of the rotor and stator assemblies includes at least three coils connected in a delta configuration for a generating rotating magnetic field, rotating with respect to the one of the rotor and stator assemblies, and another one of the rotor and stator assemblies includes devices for generating a constant magnetic field for interaction with the rotating magnetic field to effect rotation of the shaft. The at least three coils are disposed circumferentially equidistant one another on the one of the rotor and stator assemblies with non-alternating winding polarities. First, second and third sets of conversion devices for producing and conducting electric current when exposed to radiant energy and exhibiting high resistance when not exposed to radiant energy are further provided. Interconnections connect the first energy conversion device to the coils and the first, second and third sets of conversion devices such that shielding of one the first, second and third sets of conversion devices from radiant energy delivers, current to a respective one of the first, second and third coils from the first energy conversion device which is opposite in direction from a current delivered to other ones of the first, second and third coils such that the respective one of the first, second and third coils presents a magnetic field opposite in polarity with respect to magnetic fields of the other ones. The first, second and third sets of conversion devices are disposed on one of the rotor and stator assemblies and a masking device is disposed on another one of the rotor and stator assemblies not having the first, second and third sets of conversion devices, for sequentially shielding from the radiant energy one of the first, second and third sets of conversion devices as the rotor assembly rotates relative to the stator assembly to commutate current to the first, second and third coils from the first conversion device to effect rotary motion. Terminals are provided at junctions of the coils for outputting three-phase AC power.

The present invention also includes the above embodiments wherein, in the alternative, various implementations of features of the above embodiments are incorporated. For example, the charge storage devices may be capacitors, batteries, or both. Furthermore, the number of energy conversion cells or devices may be increase as required to provide a requisite voltage and/or power output.

The above, and other objects, features and advantages of the present invention will become apparent from the following description read in conjunction with the accompanying drawings, in which like reference numerals designate the same elements.

DETAILED DESCRIPTION OF THE INVENTION

Figure 1:
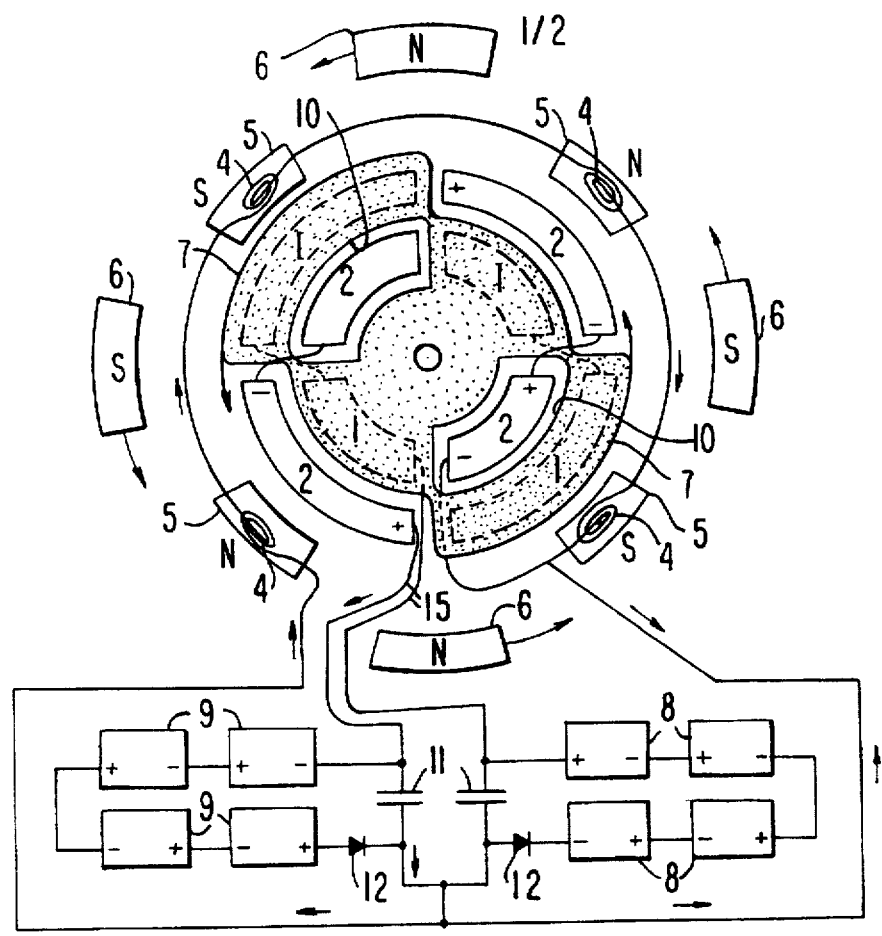
FIG. 1 is a simplified view of a mechanical layout of an embodiment of the present invention provided in conjunction with a schematic diagram of circuitry.

Referring to FIG. 1, there is shown an embodiment of the present invention having first and second sets of solar cells 1 and 2 alternatingly ranged in concentric circles above which a mask 7 is rotatably disposed on an axle 3. The mask 7 has apertures 10 and notches 10' aligned above the concentric circles of the solar cells 1 and 2 to selectively block light reaching the solar cells 1 and 2 as the mask 7 rotates on the axle 3. As shown, the mask 7 is in a position masking the first set of solar cells 1 and exposing the second set of solar cells 2. With rotation of the mask 7, the first and second sets of solar cells 1 and 2 are alternately exposed to light for the production of electric current. U.S. Pat. No. 4,634,343, issued to the present inventor, discusses rotating mask and solar cell operation and is incorporated herein by reference for its teaching directed to various mechanical arrangements of such elements.

Rotating with the mask 7 are permanent magnets 6 disposed about the perimeter of the mask 7 with alternating pole orientations. The permanent magnets 6 are shown mounted on extensions of the mask 7 to facilitate rotation with the mask 7. Together, the permanent magnets 6 and the mask 7 function as a rotor. Alternative mechanical support arrangements, allowing the permanent magnets 6 to rotate with the mask 7, may be realized and are considered to be within the scope of the present invention.

Four magnetic pole pieces 5 have coils 4 and are fixedly disposed with relation to the first and second sets of solar cells 1 and 2 to form a stator. The winding directions of the coils 4 are alternately arranged, as indicated by the polarity markings adjacent the magnetic pole pieces 5, to provide magnetic fields of alternating polarity. The magnetic pole pieces 5 are disposed radially with relation to the axle 3 to produce magnetic fields which interact with the permanent magnets 6 to produce torque on the axle 3 and effect rotation of the axle 3.

Figure 2:
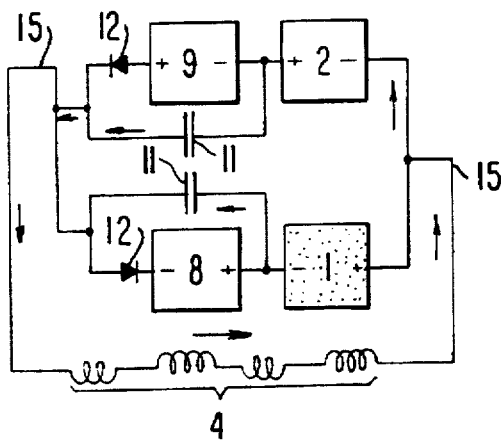
FIG. 2 is simplified schematic of the circuitry shown in FIG. 1.

Referring to FIGS. 1 and 2, first and second solar cell banks 8 and 9 are connected in parallel with capacitors 11 and are positioned at locations allowing continuous exposure to light or other radiant energy. In FIG. 1 the solar cell banks 8 and 9 are each depicted as several solar cells while in FIG. 2 the solar cell banks 8 and 9 are each shown as single blocks for purposes of clarity. Likewise, the first and second sets of solar cells 1 and 2 are illustrated as single blocks 1 and 2 respectively. It is understood that the number of solar cells constituting the banks may be varied in number depending upon output characteristics of the solar cells and power and voltage requirements. The first set of solar cells 1 has individual solar cells serially connected to each other and, in turn, serially connected to the first solar cell bank 8 by one of conductors 15. A return path from the first set of solar cells 1 to the first solar cell bank 8 is provided through the coils 4 and conductor 15'. Similarly, the second set of solar cells 1 has the solar cells serially connected to each other and, in turn, serially connected to the second solar cell bank 8 by another one of the conductors 15. The second set of solar cells 2 shares the same return path through the coils 4 and the conductor 15' to the second solar cell bank 8.

Operation of the energy conversion apparatus exploits the resistance characteristics of solar cells. When a solar cell is illuminated it produces electric current and acts as a conductor much like a battery. However, when a solar sell is not irradiated with light, there is no electric current production and the resistance of the solar cell becomes extremely high. In FIG. 1, the mask 7 is shielding the first set of solar cells 1 thereby placing them into a high resistance state illustrated in FIG. 2 by the shading of the first set of solar cells 1. Since the first set of solar cells 1 is in a high impedance state, current flow I is generated by the second set of solar cells 2 and the second bank of solar cells 9 and passes through the coils 4 to generated magnetic fields having polarities as indicated in FIG. 1. The interaction of the magnetic fields produced by the coils 4 and the magnetic fields of the permanent magnets 6 results in the generation of torque on the axle 3 and rotation of the mask 7. Rotation of the mask 7 exposes the first set of solar cells 1 to irradiation while shielding the second set of solar cells 2 from irradiation. Thus, the second set of solar cells 2 is placed into a high resistance state while the first set of solar cells is placed into a current producing state by rotation of the mask 7 through 90°. Since the first set of solar cells 1 and the first bank of solar cells 8 have a polarity with respect to the coils 4 opposite that of the second set of solar cells 2 and the second bank of solar cells 9, the current flow through the coils 4 is now reversed and the fields produced by the coils are the opposite of those shown in FIG. 1. This reversal of magnetic fields generates further torque upon the mask 7 and axle 3 because rotation of the mask 7 and permanent magnets 6 through 90° has similarly reversed the pole orientations of the permanent magnets 6 relative to the coils 4. Accordingly, commutation of the current 1 is achieved by the selective shielding of the first and second sets of solar cells 1 and 2 and a rotating magnetic field is produced by the coils 4 which drives the mask 7 by interaction with the magnetic fields of the permanent magnets 6. The commutation produces a single phase AC current which may be tapped across terminals 16 and 16' to provide power to other electric devices.

The capacitors 11 are charged by respective ones of the first and second cell banks 8 and 9. Since the first and second cell banks 8 and 9 are continuously exposed to light, their current production charges the capacitors 11 up to the voltage limit of the first and second cell banks 8 and 9. The amount of charge stored is dependent upon the characteristics of the first and second cell banks 8 and 9 and the capacity and voltage limits of the capacitors 11. While a given one of the cell banks 8 and 9 is not driving the coils 4, due to shielding of its associated one of the first and second sets of solar cells 1 and 2, all current produced by the cell banks 8 and 9 is used to charge the capacitors 11. During the portion of the cycle where a given one of the first and second banks of solar cells 8 and 9 drives the coils, power in addition to that provided by the respective one of the solar cells 1 and 2 and its associated one of the cell banks 8 and 9 is provided by the associated one of the capacitors 11 so that full use of energy, generated by the first and second cell banks 8 and 9 during both conductive and nonconductive periods of the first and second sets of solar cells 1 and 2, is used in driving the mask 7 and magnets 6 forming the rotor.

Furthermore, the terminals 16 and 16' provide access to single phase AC power generated by switching of the power produced and stored by the cell banks 8 and 9 and capacitors 11 and by the solar cells 1 and 2. Dependent upon the type and number of the cells used in the cell banks 8 and 9, storage of charge in the capacitors 11 during supply of current to the coils 4 may still be maintained allowing further capacity to supply AC power external of the energy conversion apparatus. Since the commutation operation is effected by a limited number of solar cells, the size of the mask 7 may be kept to a minimum reducing the energy required to drive the rotor assembly, that is, the mask 7 and the permanent magnets 6. Simultaneously, the number of cells in the cell banks 8 and 9 may be increased to provide a desired amount of external AC power. Optionally, the capacitors 11 may be replaced or augmented by rechargeable batteries to effect greater and longer lasting storage of electric energy. Diodes 12 prevent unwanted discharge of the capacitors 11.

Figure 3:
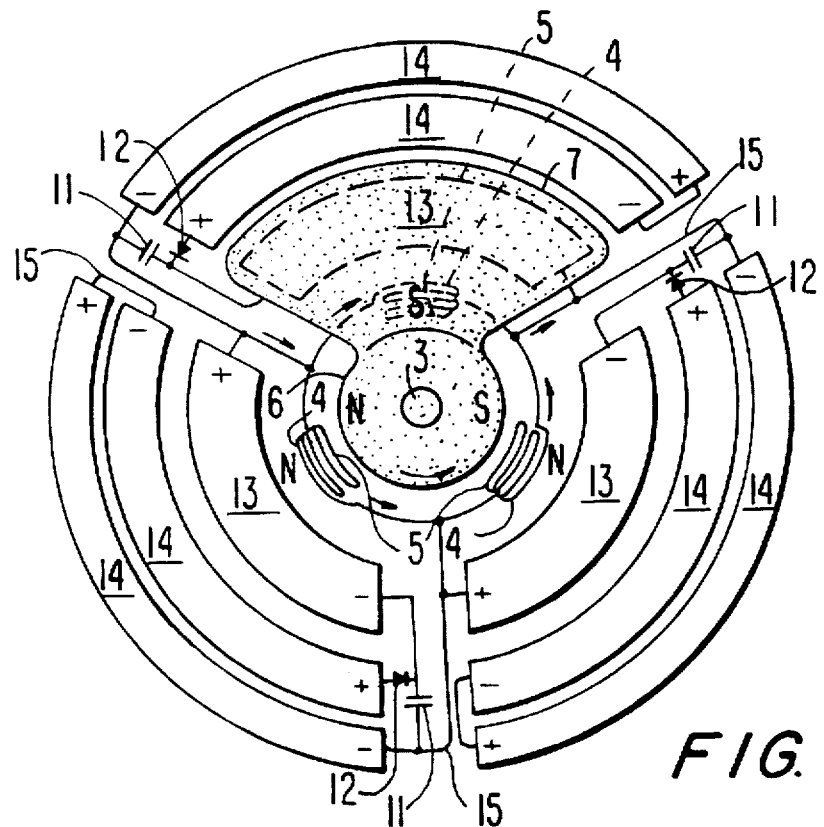
FIG. 3 is a simplified view of a mechanical layout of another embodiment of the present invention provided in conjunction with a schematic diagram of circuitry.
Figure 4:
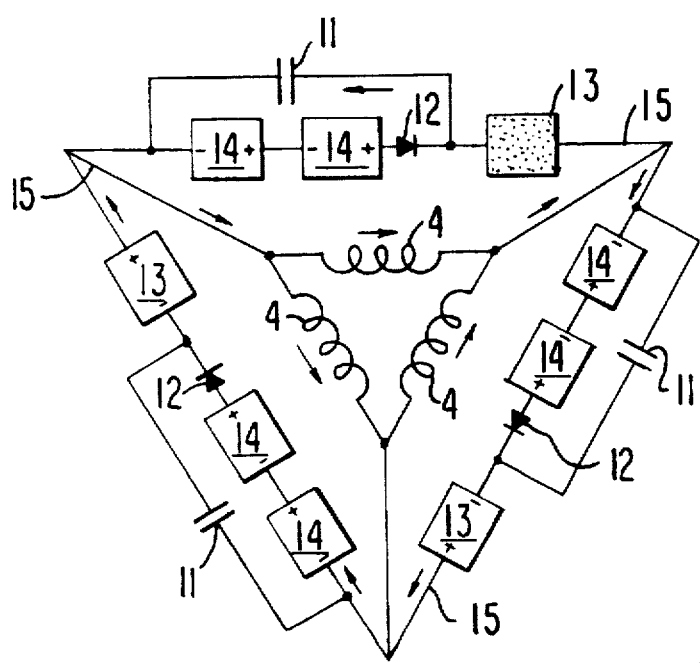
FIG. 4 is simplified schematic of the circuitry shown in FIG. 3.

Referring to FIGS. 3 and 4, a second embodiment of the present invention is illustrated which produces three-phase alternating current. A rotor assembly 20 has a permanent magnet hub 6' mounted on an axle 3 and a mask 7' extending from the magnetic hub 6' in a fan configuration subtending an angle of about 120°. A starer assembly 22 is comprised of solar cells 13a–13c and magnetic pole assemblies 5a–5c each including a respective one of coils 4a–4c. As explained below, the stator assembly 22 produces a rotating magnetic field which drives the rotor assembly 20 through interaction with the magnetic fields of the permanent magnets 6'. In FIG. 3, the mask 7' is shown shielding the solar cell 13a, the shielding of which is indicated in FIG. 4 by shading of the cell 13a.

First, second and third drive circuits 24a–24c include solar cell banks 14a–14c connected in series with respective ones of diodes 12a–12c and the solar cells 13a–13c. Further included are capacitors 11a–11c connected in parallel with respective serial combinations of the solar cell banks 14a–14c and the diodes 12a–12c. Similar to the first embodiment of the invention, the mask 7' in combination with the first, second and third solar cells 13a–13c forms a commutator for sequentially deactivating respective ones of the first, second and third drive circuits 24a–24c while the solar cell banks 14a–14c are disposed to be continuously irradiated by light. The capacitors 11a–11c may optionally be replaced or augmented by rechargeable batteries.

Referring to FIG. 4, the flow of current I is illustrated for the state where the mask 7' shields the first solar cell 13a of the first drive circuit 24a, essentially turning off current from the first drive circuit 24. The first, second and third drive circuits 24a–24c are serially connected with each other in a delta configuration as are the coils 4a–4c. The polarities of the first, second and third drive circuits 24a–24c run in the same direction about the circuit. With the first drive circuit 24a is turned off, a potential generated across the second and third coils 4b and 4c in series and the first coil 4a results in current flowing through the first coil 4a in a direction opposite to that of the second and third coils 4b and 4c which results in the second and third coils 4b and 4c generating a north pole field with respect to the permanent magnet 6' while the first coil 4a generates a south pole field with respect to the permanent magnet 6'. The effect of the magnetic field of the first, second and third coils 4a–4c is to produce torque upon the rotor assembly 20 rotating the rotor assembly 20 in a clockwise direction such that the north pole of the rotor assembly 20 aligns itself with the south pole field produce by the first coil 4a. Rotation of the rotor assembly 26 will result in the second solar cell 4b being shielded and turned off by the mask 7' which in turn results in the reversal of current in the second coil 4b to produce a south vole field while the current in the first coil 4a reverses to produce a north pole field to further provide torque for turning the rotor assembly 20. Thus, a circular rotating magnetic field is produce by sequential shielding of the solar cells 13a–13c wherein the combination of the solar cells 13a–13c and the mask 7' function as a commutator for reversing current direction in one of the first, second or third coils 4a–4c. The ratio of mask area to area of the first, second and third solar cells 13a–13c is preferably about one third while in the first embodiment the ratio is less than one half It is realized that alternative configurations of the present invention may be realized by those of ordinary skill in the art. For instance, while the present examples use solar cells for converting light into electric current, other types of energy conversion elements may optionally be used to convert other forms of energy such as heat, x-rays, or cosmic rays for example. Likewise, the number of energy converting cells used and the ratio of mask area to cell area may be varied to meet application specific requirements. Furthermore, the construction of the rotor and stator assemblies may be altered as may the relative movement of the two assemblies in that the rotor assemblies may be fixed mounted while the stator assemblies are rotatably mounted. Such variations are illustrations of some the various alterations which are considered to be within the scope and spirit of the present invention.

The present invention provides an energy conversion apparatus which efficiently produces torque, or rotary forces, and alternating current from radiant energy, such as light, without conventional mechanical cummutating elements which add weight and are subject to degradation from mechanical wear. Long life is achieved due to the elimination of mechanical commutating elements. Superior energy efficiency to achieved by eliminating the need for a DC to AC convertor for converting the DC output of the solar cells while allowing continuous exposure of the cell banks 8 and 9 to light. Furthermore, the apparatus is producible from inexpensive components and is simple, thus reducing production costs. Still further, the apparatus is configurable to provide various voltage levels by adjustment of the number of continuously irradiated solar cells while the mask and solar cell combination for commutation remains functional over a wide range of voltage levels. Additionally efficiencies are optionally provided for by the addition of rechargeable batteries in parallel with the charge storing capacitors.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A an energy conversion apparatus for converting radiant energy to rotary force comprising:

at least first and second energy conversion cell banks, each including at least one energy conversion cell for converting a radiant energy to and electric current;

said first and second energy conversion cell banks being uninterruptingly exposed to said radiant energy incident upon said energy conversion apparatus;

a rotor assembly;

a stator assembly;

means for rotatably supporting said rotor assembly relative to said stator assembly;

either one of said rotor assembly and said stator assembly having at least first and second commutating energy conversion cells and another one of said rotor assembly and said stator assembly having a mask member disposed to selectively expose and mask said first and second commutating energy conversion cells to and from said radiant energy;

either one of said rotor assembly and said stator assembly having predetermined magnetic field generating means and another one of said rotor assembly and said stator assembly having coils for generating a rotating magnetic field with respect to said coils, said predetermined magnetic field generating means and said coils be disposed proximate one another to permit interaction of said rotating magnetic field with a magnetic field of said predetermined magnetic field generating means;

connection means for connecting respective ones of said at least first and second commutating energy conversion cells with respective ones of said coils and respective ones of said at least first and second energy conversion cell banks such that current flow direction from said at least first and second energy conversion cell banks to said coils is controlled by said at least first and second commutating energy conversion cells by exposing and masking by said mask; and said mask having a configuration for exposing and masking said at least first and second commutating energy conversion cells such that said coils receive an alternating current producing said rotating magnetic field to effect rotation of said rotor by interaction of said rotating magnetic field with a magnetic field of said predetermined magnetic field generating means.

2. The energy conversion apparatus of claim 1 further comprising said at least first and second energy conversion cell banks each having a charge storage means connected in parallel therewith for storing energy converted by said at least first and second energy conversion cell banks and commutating diodes in series with each of said at least first and second energy conversion cell banks to effect charging of said charge storage means.

3. The energy conversion apparatus of claim 2 further comprising output terminals disposed across said coils for outputting AC power.

4. The energy conversion apparatus of claim 1 wherein said at least first and second energy conversion cell banks and said at least first and second commutating energy conversion cells include solar cells.

5. The energy conversion apparatus of claim 1 further comprising output terminals disposed across said coils for outputting AC power.

6. An energy conversion apparatus for converting radiant energy to rotary force and AC power, the energy conversion apparatus comprising:

first conversion means for converting radiant energy into electric current, said first conversion means being situated to be continuously exposed to a radiant energy incident upon said energy conversion apparatus;

motor means for rotating a shaft, said motor means having rotor and stator assemblies and one of said rotor and stator assemblies including coils for generating a rotating magnetic field with rotating respect to said one of said rotor and stator assemblies and another one of said rotor and stator assemblies including means for generating a constant magnetic field for interaction with said rotating magnetic field to effect rotation of said shaft;

a commutation means for applying alternating current from said first conversion means to said coils to generate said rotating magnetic field;

said commutation means including second and third conversion means for producing and conducting electric current when exposed to radiant energy and exhibiting high resistance when not exposed to radiant energy;

said commutation means including connection means for connecting said second and third conversion means to said coils and said first conversion means such that alternating exposure of said second and third conversion means delivers said alternating current to said coils from said first energy conversion means and said second and third energy conversion means; and said commutation means including said second and third energy conversion means being mounted on one of said rotor and said stator assemblies and a masking means, mounted to another one of said rotor and said stator assemblies, for alternatingly exposing and shielding said second and third energy conversion means to produce said alternating current to rotate said shaft.

7. The energy conversion apparatus of claim 6 further comprising said first conversion means having a charge storage means connected for storing energy converted by said first conversion means and commutating diode means for charging of said charge storage means.

8. The energy conversion apparatus of claim 7 further comprising output terminals disposed across said coils for outputting AC power.

9. The energy conversion apparatus of claim 6 wherein said first, second and third energy conversion means include solar cells for converting said radiant energy into electric current where said radiant energy is in the form of light.

10. The energy conversion apparatus of claim 6 further comprising output terminals disposed across said coils for outputting AC power.

11. An energy conversion apparatus for converting radiant energy to rotary force and AC power, the energy conversion apparatus comprising:

first conversion means for converting radiant energy into electric current, said first conversion means being situated to be continuously exposed to radiant energy incident upon said energy conversion apparatus and including first and second banks of conversion cells and first and second charge storage devices connected in parallel with said first and second banks of conversion cells;

motor means for rotating a shaft, said motor means having rotor and stator assemblies and one of said rotor and stator assemblies including coils for a generating rotating magnetic field rotating with respect to said one of said rotor and stator assemblies and another one of said rotor and stator assemblies including means for generating a constant magnetic field for interaction with said rotating magnetic field to effect rotation of said shaft;

said coils being serially connected and disposed circumferentially equidistant one another on said one of said rotor and stator assemblies with alternating winding polarities to produce a circumferentially alternating magnetic field when driven by current in a given direction;

first and second sets of conversion means for producing and conducting electric current when exposed to radiant energy and exhibiting high resistance when not exposed to radiant energy;

connection means for connecting said first energy conversion means to said coils and said first and second sets of conversion means such that alternating exposure of said first and second sets of conversion means delivers alternating current to said coils from said first energy conversion means and said first and second sets of conversion means;

said first and second sets of conversion means being disposed on one of said rotor and stator assemblies; and masking means, disposed on another one of said rotor and stator assemblies not having said first and second sets of conversion means, for alternately exposing to and shielding from said radiant energy said first and second sets of conversion means as said rotor assembly rotates relative to said stator assembly to commutate current to said coils from said first conversion means to effect rotary motion.

12. The energy conversion apparatus of claim 11 further comprising output terminals disposed across said coils for outputting AC power.

13. The energy conversion apparatus of claim 11 wherein said first and second banks of conversion cells and said first and second sets of conversion means include solar cells for converting said radiant energy into electric current where said radiant energy is in the form of light.

14. The energy conversion apparatus of claim 13 further comprising output terminals disposed across said coils for outputting AC power.

15. An energy conversion apparatus for converting radiant energy to rotary force and AC power, the energy conversion apparatus comprising:

first conversion means for converting radiant energy into electric current, said first conversion means being situated to be continuously exposed to a radiant energy incident upon said energy conversion apparatus and including first, second and third banks of conversion cells and first, second and third charge storage devices connected in parallel with said first, second and third banks of conversion cells;

motor means for rotating a shaft, said motor means having rotor and stator assemblies and one of said rotor and stator assemblies including at least three coils connected in a delta configuration for generating a rotating magnetic field, rotating with respect to said one of said rotor and stator assemblies, and another one of said rotor and stator assemblies including means for generating a constant magnetic field for interaction with said rotating magnetic field to effect rotation of said shaft;

said at least three coils being disposed circumferentially equidistant one another on said one of said rotor and stator assemblies with non-alternating winding polarities;

first, second and third sets of conversion means for producing and conducting electric current when exposed to radiant energy and exhibiting high resistance when not exposed to radiant energy;

connection means for connecting said first energy conversion means to said coils and said first, second and third sets of conversion means such that shielding of one said first, second and third sets of conversion means from radiant energy provides a current to a respective one of said first, second and third coils from said first energy conversion means which is opposite in direction from a current delivered to other ones of said first, second and third coils such that said respective one of said first, second and third coils presents a magnetic field opposite in polarity from magnetic fields of said other ones;

said first, second and third sets of conversion means being disposed on one of said rotor and stator assemblies; and masking means, disposed on another one of said rotor and stator assemblies not having said first, second and third sets of conversion means, for sequentially shielding from said radiant energy one of said first, second and third sets of conversion means as said rotor assembly rotates relative to said stator assembly to commutate current to said first, second and third coils from said first conversion means to effect rotary motion.

16. The energy conversion apparatus of claim 15 further comprising output terminals disposed at junctions of said first, second and third coils for outputting three-phase electric AC power.

17. The energy conversion apparatus of claim 15 wherein said first, second and third banks of conversion cells and said first, second and third sets of conversion means include solar cells for converting said radiant energy into electric current where said radiant energy is in the form of light.

18. The energy conversion apparatus of claim 17 further comprising output terminals disposed at junctions of said first, second and third coils for outputting three-phase electric AC power.

* * * * *